(12) United States Patent  (10) Patent No.: US 7,506,734 B2
Potter  (45) Date of Patent: Mar. 24, 2009

(54) VEHICLE BRAKE SYSTEM

(75) Inventor: Laurence John Potter, Birmingham (GB)

(73) Assignee: Haldex Brake Products Ltd. (GB)

( * ) Notice: Subject to any disclaimer, the term of this patent is extended or adjusted under 35 U.S.C. 154(b) by 587 days.

(21) Appl. No.: 10/854,864

(22) Filed: May 27, 2004

(65) Prior Publication Data

US 2005/0011708 A1   Jan. 20, 2005

(30) Foreign Application Priority Data

May 31, 2003  (GB) ................................. 0312498.9

(51) Int. Cl.
*B60T 13/04* (2006.01)
*F16D 65/14* (2006.01)
(52) U.S. Cl. .................. 188/174; 188/176; 188/72.6
(58) Field of Classification Search ............... 188/174, 188/176, 72.6, 72.9, 73.1, 73.41, 79.55, 195, 188/206 R
See application file for complete search history.

(56) References Cited

U.S. PATENT DOCUMENTS

| | | | | | |
|---|---|---|---|---|---|
| 1,297,915 | A | * | 3/1919 | Sabalala | 188/41 |
| 2,250,725 | A | * | 7/1941 | Ranson | 188/195 |
| 2,824,713 | A | * | 2/1958 | Kelley | 244/111 |
| 5,131,511 | A | * | 7/1992 | Appleberry | 188/176 |

FOREIGN PATENT DOCUMENTS

| | | |
|---|---|---|
| GB | 1222879 | 9/1968 |
| GB | 2001145 A | 7/1978 |
| GB | 2074273 A | 4/1981 |
| GB | 2 160 941 A | 1/1986 |
| WO | WO 97/38880 | 10/1997 |

* cited by examiner

*Primary Examiner*—Melody M Burch
(74) *Attorney, Agent, or Firm*—St. Onge Steward Johnston & Reens, LLC

(57) ABSTRACT

A vehicle brake system comprising an actuator and a mechanical linkage, whereby a force produced by the weight of the vehicle is transmitted via the mechanical linkage to the actuator to provide a braking force.

19 Claims, 2 Drawing Sheets

VEHICLE BRAKE SYSTEM

BACKGROUND TO THE INVENTION

This invention relates to a vehicle brake system, particularly, but not exclusively, for use in commercial vehicles such as lorries.

DESCRIPTION OF THE PRIOR ART

Conventionally, commercial load-carrying vehicles such as lorries have a brake system operable to provide both service braking, that is braking to decelerate the vehicle in motion, and parking braking, that is to provide a braking force to hold the vehicle stationary. It will be apparent that the actual force required to be generated by a parking brake is dependent on such factors as the vehicle loading, distribution of the load on the vehicle and whether or not the vehicle is parked on a hill. To accommodate all possible brake situations, the force generated by each parking brake is selected on the assumption that the vehicle is fully loaded and parked on a slope.

In practice, this means a much higher braking force than necessary may be applied to each set of brakes when the parking brake is applied, whether or not the parking brake is a spring brake or a lock actuator or otherwise. The high force involved can produce additional strain and wear on the brake assemblies, and cannot be adapted in response to the vehicle's load or parking condition. A further disadvantage with spring parking brakes is that the major mode of failure is failure of the spring, which is a strong spring under substantial compression in order to provide the high braking force.

SUMMARY OF THE INVENTION

An aim of the present invention is to reduce or overcome the above problem.

In accordance with the present invention, we provide a vehicle brake system comprising an actuator and a mechanical linkage, whereby a force produced by the weight of the vehicle is transmitted via the mechanical linkage to the actuator to provide a braking force.

The brake system may comprise a first part associated with a chassis of the vehicle and a second part associated with a wheel support part moveable relative to the chassis, wherein the mechanical linkage is connected between the first part and the second part to cause movement of the actuator in response to relative movement of the first part and the second part.

A suspension element may be disposed between a chassis and the wheel support to transmit the vehicle weight from the chassis to the support part.

The suspension element may be controllable to permit the first part and second part move relative to one another.

The suspension element may comprise a pneumatic or hydraulic element wherein the pressure in the pneumatic or hydraulic element is controllable.

The vehicle brake system may comprise an interlock to releasably connect the mechanical linkage to one of the first part and the second part.

The interlock may comprise a clamp member operable to engage a clamp surface provided on the chassis.

The brake actuator may comprise a moveable rod moveable to apply a braking force.

The brake actuator may comprise a service brake actuator operable to supply service braking.

BRIEF DESCRIPTION OF THE DRAWINGS

The invention will now be described by way of example only, wherein.

DESCRIPTION OF THE PREFERRED EMBODIMENT

Figure 1:
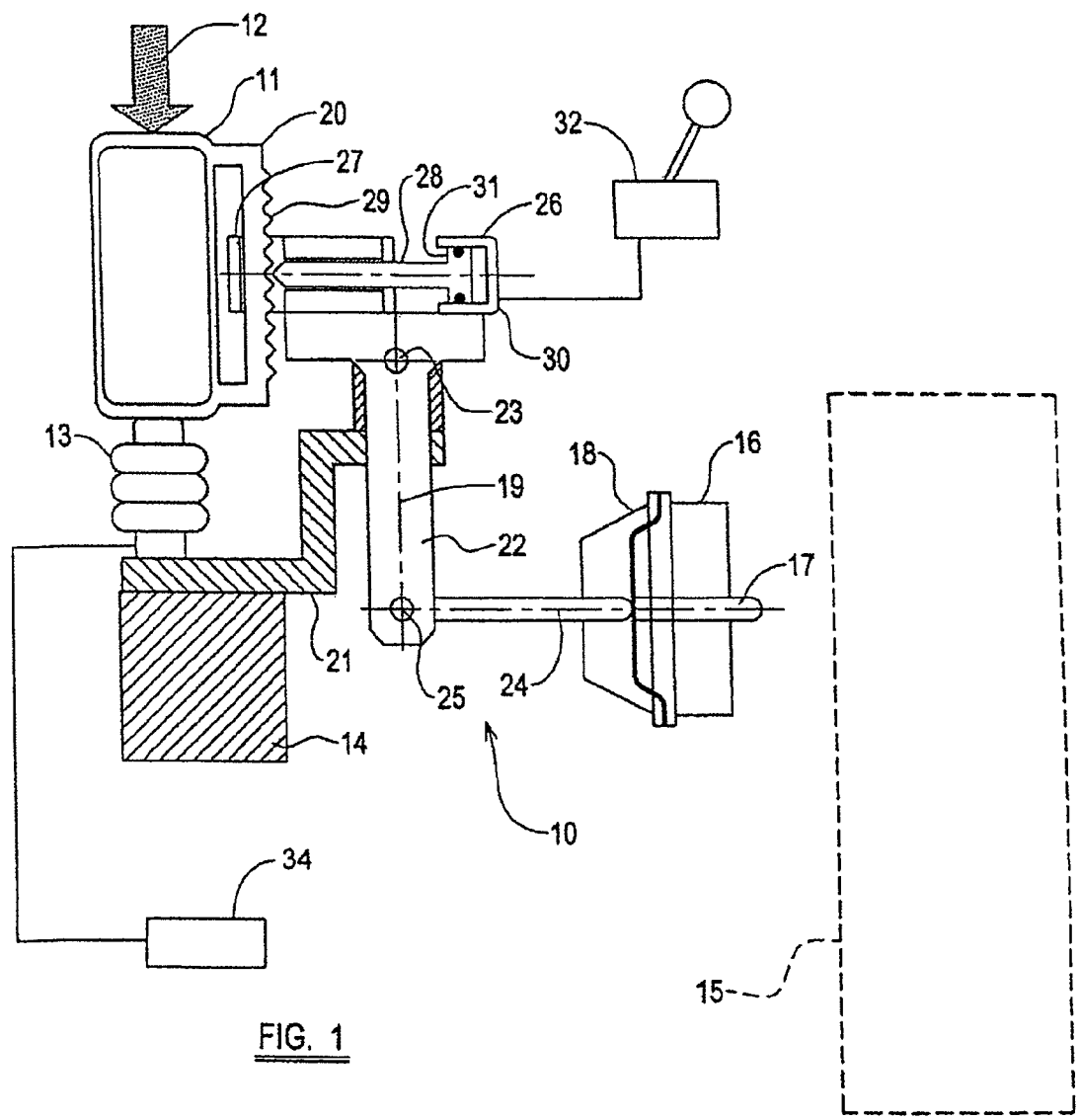
FIG. 1 is a diagrammatic illustration of a vehicle brake system embodying the present invention in a first, unbraked configuration.

Referring now to FIG. 1, a vehicle brake system embodying the invention is generally shown at 10 provided on a vehicle. A part of a chassis of the vehicle is generally indicated at 11 and bears part of the weight of the vehicle and its load as shown by arrow 12. A suspension element 13 is located below the chassis 11 and is connected to a vehicle support part generally shown at 14. The vehicle support part can support a wheel shown schematically in dashed outline at 15. In the present example, the suspension element 13 comprises a deformable pneumatic or hydraulic element which, in the example of a pneumatic element, is supplied with compressed air from a pneumatic system 34 of the vehicle and provides ride cushioning between the wheel support part 14 and the chassis 11. The pneumatic or hydraulic pressure supplied to the suspension element 13 is controllable to vary its resilience and the ride height of the chassis.

To provide a braking force, a brake actuator is generally shown at 16 comprising an actuating rod 17. To provide service braking, the actuating rod 17 is connected to a diaphragm 18, and pneumatic or hydraulic pressure may be supplied to the actuator 16 to provide service braking in conventional manner.

To provide parking braking, the vehicle brake system comprises a mechanical linkage 19, a first, clampable, part 20 associated with the chassis 11 and a second, support part 21 associated with the wheel support part 14. The mechanical linkage comprises a first arm 22 pivotably connected by pivot shown at 23 towards its upper end to the second part 21, and a second arm 24 pivotably connected by pivot 25 to the first arm 22 and moveable to act on the diaphragm 18 to cause the actuating rod 17 to extend to provide service braking.

The mechanical linkage 19 further comprises an interlock mechanism 26 operable to engage the first part 20. The interlock mechanism 26 comprises a guide element 27 which extends behind and is moveable relative to the first part 20, and a clamp member 28 which is moveable to engage a clamp surface 29 of the first part 20 and so clamp the first part 20 against the guide means 27. In this example, the clamp surface 29 is provided with a series of ridges which may be engaged by the clamp member 28, but it will be apparent that the surface 29 and interlock mechanism 26 may be provided in any other appropriate fashion as desired. In this example, the interlock mechanism 26 comprises a pneumatic cylinder 30 provided with a piston 31 which may be supplied with pneumatic pressure from a control generally shown at 32 provided in a cab of a vehicle to cause the clamp member 28 to engage the clamping surface 29.

During normal operation of the vehicle the suspension element 13 is inflated to its conventional pressure to provide the appropriate ride height and positioning and the clamp member 28 is in its retracted position as shown in FIG. 1. Thus, as the suspension element 13 is compressed as the vehicle goes over, for example, bumps in the road, the interlock mechanism 26 will move without hindrance relative to the first part 20 and no force will be transmitted to move the mechanical link 19.

Figure 2:
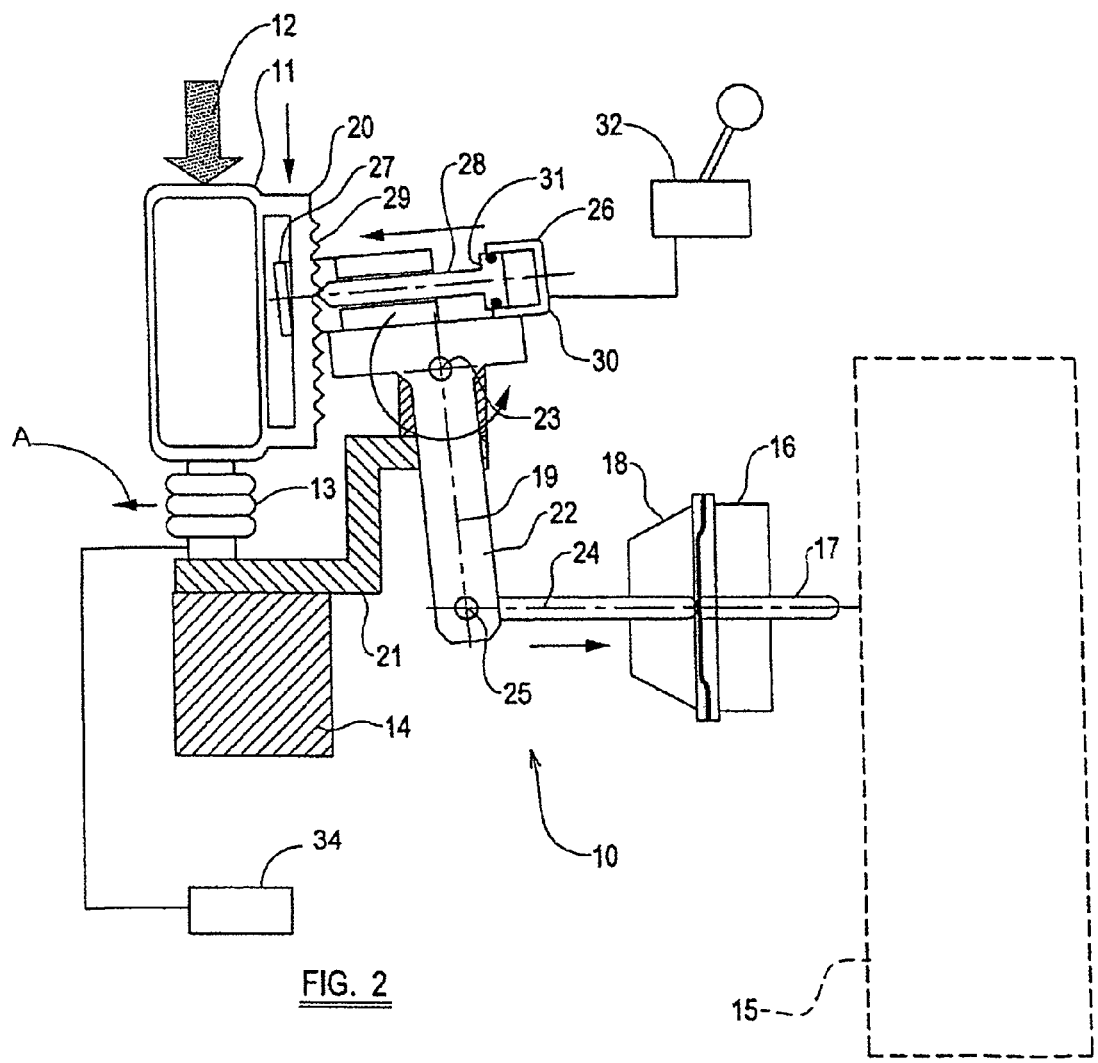
FIG. 2 is a diagrammatic illustration of the vehicle brake system of FIG. 1 in a parked configuration.

When the vehicle is stationary and it is desired to supply parking braking, the driver will operate the control 32 to supply pneumatic pressure to the cylinder 30 thus causing the clamp member 28 to extend and engage the clamp surface 29. The pressure in the suspension element 13 is released, thus causing the chassis 11 to descend under the force of gravity acting on the vehicle as indicated at 12. The chassis 11 will therefore descend towards the wheel support part 14 causing the first part 20 and second part 21 to move relatively closer to one another. The relative movement between the first part 20 and second part 21 will cause the first arm 22 to rotate about pivot 23 as shown, thus causing the second arm 24 to move to the right as shown in FIG. 2, extending the actuating rod 17 to apply a braking force.

When it is desired to release the braking force the operation is performed in reverse. Pneumatic pressure is supplied to the suspension element 13 to lift the chassis 11 relative to the wheel support part 14, thus rotating the first arm 22 in a clockwise direction and withdrawing the second arm 24 to the left as shown in the Figures. The clamp member 28 is then retracted and the vehicle brake system 10 then returns to the condition of FIG. 1.

The vehicle braking system 10 is thus particularly advantageous in that the parking force provided through the actuating rod 17 is proportional to the force 12, i.e. the force due to the vehicle weight. Further, if the vehicle is parked on a hill, the shift in load distribution is automatically compensated for as the force 12 over those wheels 14 towards the downhill part of the vehicle will be greater and so the force applied to the brakes of those wheels will itself be greater. The characteristics of the brake mechanism 10 can be adjusted by varying the sizes and pivot locations of the mechanical linkage 19. In the present example, the mechanical linkage 19 is selected such that for a 20 tonne vehicle, a 10 mm drop in the height of the chassis 11 causes a 50 mm movement in the second arm 24 to provide a 10 kN parking force. It will be apparent that the mechanical linkage 19 can be varied as desired, however, to provide any appropriate mechanical advantage and hence braking force as required.

It will be apparent that the vehicle brake system of the present invention will compensate automatically for changes in the load or attitude of the vehicle while the vehicle is parked. For example, if a load is added to or removed from the vehicle, the changes in the vehicle weight acting at each wheel will cause the vehicle brake system to generate an appropriate braking force at each wheel.

There are many other advantages of the present invention. As there is no parking brake spring, a failure mode associated with such springs is avoided. Further, the vehicle brake system 10 has full compliance. When a parking force is applied to a brake where the brake pads are hot, as the brake pads cool they will shrink and if there is no corresponding movement in the actuating rod 17, the braking force produced will diminish. In this example, it will be apparent, however, that as the brake discs cool, the force on the actuating rod 17 will be maintained as the chassis 11 will drop slightly further and maintain the braking force.

It will be apparent that the interlock mechanism 26 may be provided otherwise as desired and the main requirement is that the clamp member 28 can engage the clamp surface 29 at any level over its range of travel, thus permitting some relative movement between the first part 20 and second part 21 during normal operation of the vehicle.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

This invention claimed is:

1. A brake system for a road vehicle, the brake system comprising an actuator, a mechanical linkage, a first part associated with a chassis of the vehicle and a second part associated with a wheel support part of the vehicle and moveable relative to the chassis, wherein the mechanical linkage is connected to the first part and second part to cause movement of the actuator in response to movement of the chassis relative to the wheel support part, wherein a suspension element is disposed between the chassis and the wheel support part, the suspension element being controllable by supplying pneumatic or hydraulic pressure thereto to provide ride cushioning and, to apply a braking force, being controllable to lower the chassis relative to the wheel support part such that the weight of the vehicle is transmitted via the mechanical linkage to the actuator to provide a braking force.

2. A vehicle brake system according to claim 1 comprising an interlock to releasably connect the mechanical linkage to one of the first part and the second part.

3. A vehicle brake system according to claim 2 wherein the interlock comprises a clamp member operable to engage a clamp surface provided on the chassis.

4. A vehicle brake system according to claim 1 wherein the brake actuator comprises a moveable rod moveable to apply the braking force.

5. A vehicle brake system according to claim 1 wherein the brake actuator comprises a service brake actuator operable to supply service braking.

6. A brake system for a road vehicle having a chassis and a wheel support part, the brake system comprising:
   a first part for connecting the system to the chassis of the vehicle;
   a second part for connecting the system to the wheel support part of the vehicle;
   a suspension element disposed between said first part and said second part, said suspension element being adapted to expand to cushion said second part against the weight of the vehicle and to contract to lower said first part relative to said second part;
   mechanical linkage connected to one of said first and second parts and adapted to engage the other of said first and second parts; and
   a brake actuator connected to said linkage such that, when said linkage engages the other of said first and second parts, said mechanical linkage moves said actuator to supply a braking force as said first part is lowered relative to said second part in response to the weight of the vehicle.

7. The system of claim 6, wherein said suspension element is pneumatically or hydraulically controlled.

8. The system of claim 6, wherein said brake actuator is pivotally connected to said linkage, and said linkage is pivotally connected to the one of said first and second parts.

9. The system of claim 6, comprising an interlock by which said mechanical linkage engages the other of said first and second parts.

10. The system of claim 9, wherein said interlock comprises a clamp member provided on said mechanical linkage that is adapted to engage a clamp surface provided on the one of said first and second parts.

11. The system of claim 6, wherein the brake actuator comprises a moveable rod for applying the braking force.

12. The system of claim 6, wherein the brake actuator comprises a service brake actuator operable to supply service braking.

13. A brake system for a road vehicle having a chassis and a wheel support part, the brake system comprising:
   a first part for connecting the system to the chassis of the vehicle;
   a second part positioned below said first part for connecting the system to the wheel support part of the vehicle;
   a suspension element disposed between said first part and said second part for selectively cushioning said second part against the weight of the vehicle and allowing said first part to descend towards said second part in response to the weight of the vehicle;
   mechanical linkage connected to one of said first and second parts and adapted to engage the other of said first and second parts; and
   a brake actuator connected to said linkage such that, when said linkage engages the other of said first and second parts and said first part descends towards said second part in response to the weight of the vehicle, said first part causes said mechanical linkage to move said actuator in a substantially horizontal direction to supply a braking force.

14. The system of claim 13, wherein said brake actuator is pivotally connected to said linkage, and said linkage is pivotally connected to the one of said first and second parts.

15. The system of claim 13, comprising an interlock by which said mechanical linkage engages the other of said first and second parts.

16. The system of claim 15, wherein said interlock comprises a clamp member provided on said mechanical linkage that is adapted to engage a clamp surface provided on the one of said first and second parts.

17. The system of claim 13, wherein the brake actuator comprises a moveable rod for applying the braking force.

18. The system of claim 13, wherein the brake actuator comprises a service brake actuator operable to supply service braking.

19. The system of claim 13, wherein said suspension element is pneumatically or hydraulically controlled.

* * * * *